(No Model.)
J. THOMSON & F. LAMBERT.
SUBSTITUTE FOR STUFFING BOXES.
No. 452,484. Patented May 19, 1891.
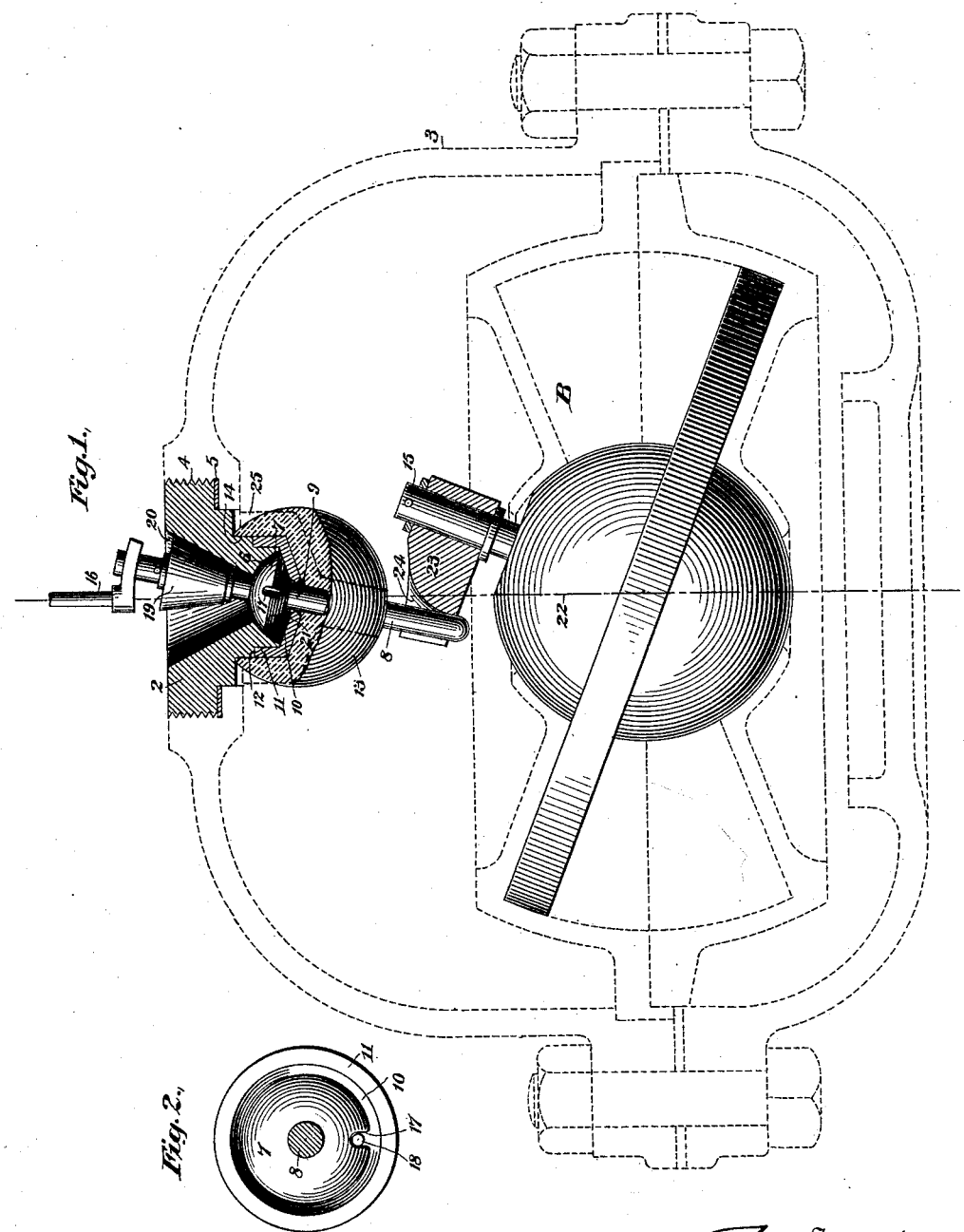
Witnesses
Geo. W. Breck.
C. E. Ashley
Inventors:
John Thomson
Frank Lambert

UNITED STATES PATENT OFFICE.

JOHN THOMSON AND FRANK LAMBERT, OF BROOKLYN, ASSIGNORS TO THE THOMSON METER COMPANY, OF NEW YORK, N. Y.

SUBSTITUTE FOR STUFFING-BOXES.

SPECIFICATION forming part of Letters Patent No. 452,484, dated May 19, 1891.

Application filed January 3, 1891. Serial No. 376,654. (No model.)

*To all whom it may concern:*

Be it known that we, JOHN THOMSON, a citizen of the United States, and FRANK LAMBERT, a citizen of the Republic of France, residing at Brooklyn, Kings county, New York, have invented certain new and useful Improvements in Substitutes for Stuffing-Boxes, of which the following is a specification.

This invention consists in a device for substituting the ordinary stuffing-box, particularly applicable to water-meters, fully set forth hereinafter, and illustrated in the accompanying drawings, in which—

Figure 1 is an elevation and section showing one application of the device to meters employing the disk-action, and Fig. 2 an enlarged detail view.

The construction of the device in detail is as follows: A casing 3 of any suitable construction (the casing of a water-meter being shown) is formed in part with or is adapted to receive a threaded plug 2. Where the plug is separate from the casing there is a gasket 5 insuring a joint. At the inner end of the plug is a spherical socket 6 to which the ball-segment 7 of a spindle 8 is adapted. The center from which the ball and socket are developed is at 9. A thin but rigid conical washer 10 is applied perforated at its apex to a slightly-greater diameter than that of the spindle, and flanged, as at 11, which flange is adapted to a bearing 12 on the plug. To the parts thus far described is now added the yielding or elastic inclosing tip 13, preferably of spherical contour, made of soft rubber, gutta-percha, leather, or the like, fast to the spindle, and also to the lower inwardly-projecting hub or bearing 14 of the plug. It will now be seen that the spindle is free to be gyrated in any direction, whereby it may be utilized to transmit rotary motion, as from the shaft 15 of the disk-action B within the casing to the arm and shaft 16 without the casing.

The advantages of the construction so far described are as follows: The ball and socket, preferably segmental, as shown, properly define the center of motion and provide ample bearing-surface to withstand the outward thrust due to the internal pressure. The location, as described, of the center of the ball and socket permits the minimum size of perforation in the washer. The function of the washer is to receive the pressure transmitted through the tip, entirely relieving the ball and socket of any pressure due to compression of the tip. The tip incloses both the washer and the spindle to make an absolutely tight joint, as the greater the pressure within the casing the more intimate will be the contact of the tip upon the spindle and the hub. The spherical contour of the tip is preferable, for the reason that it will the better resist pressure without being itself distorted and offers but slight resistance to the action of the spindle. Thus, furthermore, is overcome the chief disadvantage in devices of this kind as heretofore designed, in that the slight area here exposed to the full internal pressure, that only of the spindle, is such as to not materially affect the uniformity or sensitiveness of the action between wide ranges of pressure. In actions of this type there is a tendency less or greater, depending upon the frictional resistance or work being done, to revolve the spindle tending to loosen it in the tip, &c. This is here avoided by forming a slot 17 in the segmental ball, to which a pin 18 fast in the washer or the socket is freely adapted. In this wise any tendency to rotate is resisted by the walls of the slot and pin, although the spindle is perfectly free to be gyrated.

Where heavy duty is required, a conical roller 19 is mounted upon the spindle to roll in contact with the wall 20 of the conical recess in the plug, and the lower surface of the segmental ball 21 is formed conical, whereby to differentially roll and slip upon the inner surface of the washer. In this wise any tendency to cramp the spindle or to increase the diameter of the opening in the washer is avoided.

The normal position of the spindle is coincident with the center line 22 due to the resiliency of the elastic tip; hence to insure the ready engagement of the spindle with the primary driving action, when assembling the parts, the arm 23 is provided with a flaring entrance-slot 24, which extends back of the said center, so that when the plug is inserted the spindle will be properly guided to position.

It is not necessary to the operation of the device that the washer be conical, although the described form presents among others the advantage of strength. So, too, the rubber tip may be otherwise formed, as indicated by dotted lines 25. It will also be observed that the device when used in connection with a disk-action also acts as a means of control for the disk, the tension of the tip, the contact of the conical roller and of the lower surface of the ball-segment upon the washer all tending to maintain the disk in proper contact with the frustums of the disk-chamber casing.

Without limiting ourselves to the precise construction shown, we claim—

1. The combination, with the plug and spindle having a segmental ball-and-socket bearing, of the internal washer inclosed by an elastic or yielding tip secured to the plug and to the spindle, for the purpose specified.

2. The elastic or yielding tip and rigid washer inclosed thereby, in combination with the ball-and-socket bearing, the spindle, and the plug, substantially as described.

3. The combination, with a spindle adapted to be gyrated to transmit rotary motion, of a spherical elastic or yielding tip fast to the spindle and to the mounting thereof, substantially as specified.

4. The combination, with the elastic or yielding tip, spindle, and ball and socket properly mounted, of the washer having the perforation for the spindle coincident with the center of motion of the said ball and socket, substantially as specified.

5. The combination, with the elastic or yielding tip, spindle, and ball and socket properly mounted, of the conical washer, substantially as specified.

6. The combination, with the elastic or yielding tip, washer, spindle, and ball and socket properly mounted, of the slot and pin, for the purpose specified.

7. The combination of the spindle and elastic tip properly mounted, adapted to be gyrated to transmit rotary motion with the driving-arm having a flaring slot, substantially as shown and described.

In testimony whereof we have signed our name to this specification in the presence of two subscribing witnesses.

JOHN THOMSON.
FRANK LAMBERT.

Witnesses:
EDWD. K. ANDERTON,
W. S. McARTHUR.